United States Patent
Holmes et al.

(10) Patent No.: US 7,601,092 B2
(45) Date of Patent: Oct. 13, 2009

(54) VEHICLE PROPULSION SYSTEM

(75) Inventors: Alan G. Holmes, Clarkston, MI (US); Gregory A. Hubbard, Brighton, MI (US); Anthony H. Heap, Ann Arbor, MI (US); William R. Cawthorne, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 487 days.

(21) Appl. No.: 11/611,373

(22) Filed: Dec. 15, 2006

(65) Prior Publication Data

US 2007/0149348 A1 Jun. 28, 2007

Related U.S. Application Data

(60) Provisional application No. 60/753,803, filed on Dec. 23, 2005.

(51) Int. Cl.
*B60K 1/02* (2006.01)
*B60W 10/02* (2006.01)
*G06F 7/00* (2006.01)

(52) U.S. Cl. .............................. 477/3; 477/115; 701/51
(58) Field of Classification Search .................... 477/3, 477/115; 180/65.2, 65.3, 65.4; 701/51, 57
See application file for complete search history.

(56) References Cited

U.S. PATENT DOCUMENTS

| 6,953,409 | B2 * | 10/2005 | Schmidt et al. ................. 475/5 |
| 2005/0080537 | A1 * | 4/2005 | Cawthorne et al. ............ 701/51 |
| 2006/0155453 | A1 * | 7/2006 | Han et al. ..................... 701/54 |
| 2007/0232440 | A1 * | 10/2007 | Han ................................ 477/3 |

* cited by examiner

*Primary Examiner*—Roger Pang

(57) ABSTRACT

A vehicle propulsion system includes an internal combustion engine having an engine output, an electro-mechanical transmission and a control system. The engine output is coupled to the transmission output at a speed ratio which is established by one of a plurality of electrically variable or fixed operating modes. Selection and control among the various operating modes is managed by a control in accordance with preferred optimum operating costs.

17 Claims, 7 Drawing Sheets

VEHICLE PROPULSION SYSTEM

CROSS REFERENCE TO RELATED APPLICATIONS

This application claims priority from U.S. Provisional Application Ser. No. 60/753,803 filed Dec. 23, 2005, the contents of which are incorporated herein by reference, from U.S. patent application Ser. No. 11/561,156 filed Nov. 17, 2006, the contents of which are incorporated herein by reference, and from U.S. patent application Ser. No. 11/561,140 filed Nov. 17, 2006, the contents of which are incorporated herein by reference.

TECHNICAL FIELD

This invention pertains generally to vehicle propulsion systems, and more specifically to hybrid vehicle propulsion system.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the preferable gear ratios for wide range operation.

One hybrid powertrain architecture comprises a two-mode, compound-split, electro-mechanical transmission which utilizes an input member for receiving power from a prime mover power source and an output member for delivering power from the transmission, typically to a vehicle driveline. The prime mover power source typically comprises an internal combustion engine. Motive torque is transmitted to the transmission from first and second electrical machines operatively connected to an energy storage device for interchanging electrical power therebetween. A control unit is provided for regulating the electrical power interchange between the energy storage device and the electrical machines.

There is a need for a hybrid powertrain control system having a control architecture that is operable to select an optimal operating mode and optimal operating point, and operable to control operation of the powertrain system.

SUMMARY OF THE INVENTION

A vehicle propulsion system includes an internal combustion engine having an engine output, an electro-mechanical transmission and a control system. The transmission has a transmission input and a transmission output with the transmission input operatively coupled to the engine output. The transmission also has at least one planetary gear set operatively coupling the transmission input to the transmission output at a speed ratio, at least one rotatable electric machine operatively coupled to the at least one planetary gear set, and at least one torque transfer device applied and released to selectively establish one of (a) an electrically variable operating mode wherein the speed ratio is a function of the at least one rotatable electric machine's speed and (b) a fixed operating mode wherein the speed ratio is fixed. The control system is operable to monitor operator inputs and operating conditions of the engine and the transmission, determine permissible ones of the electrically variable and fixed operating modes and respective optimum operating costs, and control operation of the engine, the at least one rotatable electrical machine, and the at least one torque transfer device to effect the one of the permissible ones of the electrically variable and fixed operating modes having a preferred optimum operating cost.

The electro-mechanical transmission may include a pair of compounded planetary gear sets and a pair of torque transfer devices applied and released in combinations to selectively establish one of either (a) any one of first and second electrically variable operating modes wherein the speed ratio of each electrically variable operating mode is a function of the at least one rotatable electric machine's speed and (b) a fixed operating mode wherein the speed ratio is fixed, and accordingly the control system may be operable to control operation of the engine, the at least one rotatable electrical machine, and the pair of torque transfer devices to effect the one of the permissible ones of the electrically variable and fixed operating modes having a preferred optimum operating cost.

The electro-mechanical transmission may include a pair of compounded planetary gear sets and three torque transfer devices applied and released in combinations to selectively establish one of either (a) any one of first and second electrically variable operating modes wherein the speed ratio of each electrically variable operating mode is a function of the at least one rotatable electric machine's speed and (b) any one of two fixed operating modes wherein the speed ratio of each fixed operating mode is fixed, and accordingly the control system may be operable to control operation of the engine, the at least one rotatable electrical machine, and the three torque transfer devices to effect the one of said permissible ones of the electrically variable and fixed operating modes having a preferred optimum operating cost.

The electro-mechanical transmission may include a pair of compounded planetary gear sets and three torque transfer devices applied and released in combinations to selectively establish one of either (a) any one of first or second electrically variable operating modes wherein the speed ratio of each electrically variable operating mode is a function of the at least one rotatable electric machine's speed and (b) any one of three fixed operating modes wherein the speed ratio of each fixed operating mode is fixed, and accordingly the control system may be operable to control operation of the engine, the at least one rotatable electrical machine, and the three torque transfer devices to effect the one of said permissible ones of the electrically variable and fixed operating modes having a preferred optimum operating cost.

The electro-mechanical transmission may include a pair of compounded planetary gear sets and four torque transfer devices applied and released in combinations to selectively establish one of either (a) any one of first or second electrically variable operating modes wherein the speed ratio of each electrically variable operating mode is a function of the at least one rotatable electric machine's speed and (b) any one of four fixed operating modes wherein the speed ratio of each fixed operating mode is fixed, and accordingly the control system may be operable to control operation of the engine, the at least one rotatable electrical machine, and the four torque transfer devices to effect the one of said permissible ones of the electrically variable and fixed operating modes having a preferred optimum operating cost.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DESCRIPTION OF THE PREFERRED EMBODIMENT

Figure 1:
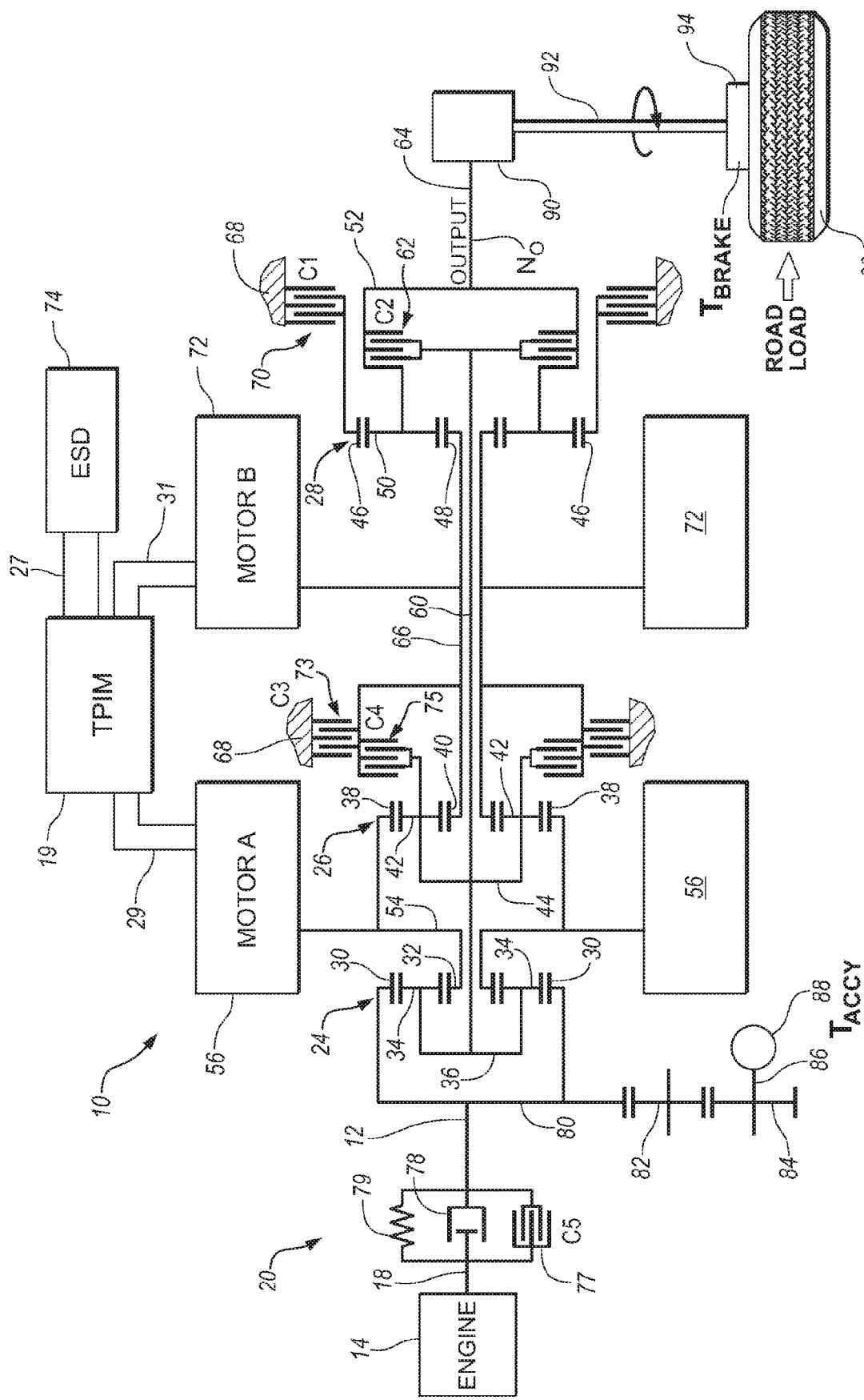
FIG. 1 is a schematic diagram of an exemplary powertrain, in accordance with the present invention.
Figure 2:
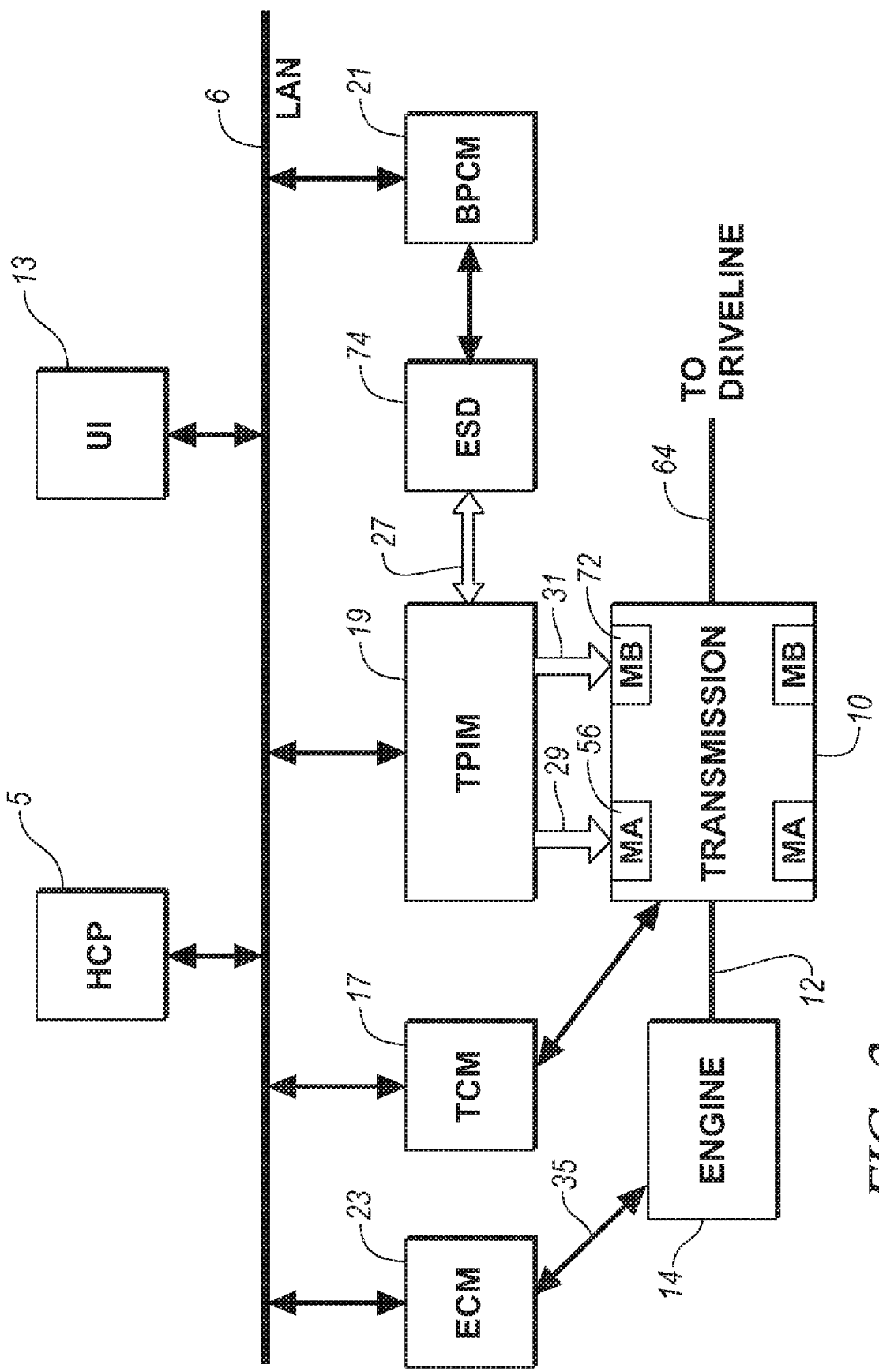
FIG. 2 is a schematic diagram of an exemplary control architecture and powertrain, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, issued on Oct. 11, 2005, entitled TWO-MODE, COMPOUND-SPLIT, HYBRID ELECTRO-MECHANICAL TRANSMISSION HAVING FOUR FIXED RATIOS, the contents of which are incorporated herein by reference. The exemplary two-mode, compound-split, electro-mechanical hybrid transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 preferably utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first electrical machine 56, comprising a motor/generator, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second electrical machine 72, comprising a motor/generator, also referred to as 'Motor B'.

All the planetary gear sets 24, 26 and 28 as well as the two electrical machines 56 and 72 are coaxially oriented, as about the axially disposed shaft 60. Electrical machines 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit, which is not described in detail herein.

The hybrid transmission 10 receives input motive torque from a plurality of torque-generative devices, including the engine 14 and the motors/generators 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first electrical machine 56 by transfer conductors 29, and the TPIM 19 similarly communicates with the second electrical machine 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In a motive torque-generative mode, the respective inverter receives current from the DC lines and provides AC current to the respective motor over transfer conductors 29 and 31. In an electrical energy regenerative control mode, the respective inverter receives AC current from the electrical machine over transfer conductors 29 and 31 and provides current to the DC lines 27. The net DC current provided to or from the inverters determines the charge or discharge operating mode of the electrical energy storage device 74. Preferably, Motor A 56 and Motor B 72 comprise three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and machines 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, $T_{E\_CMD}$; clutch torque commands, $T_{CL\_N}$ for the various clutches C1, C2, C3, C4 of the hybrid transmission 10; and motor torque commands, $T_{A\_CMD}$ and $T_{B\_CMD}$, for the electrical machines A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, $T_{AXLE\_DES}$, and an indication of actual engine torque, $T_E$, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_E$) to shaft 18 leading to the transmission 10, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. For simplicity, TCM 17 is shown generally having bi-directional interface with transmission 10 via aggregate line 41. Inputs from the TCM 17 to the HCP 5 include clutch torques, $T_{CL\_N}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$.

The Transmission Power Inverter Module (TPIM) 19 includes a pair of power inverters and motor control processors 22, 33 configured to receive motor control commands and control inverter states therefrom to provide motor drive or regeneration functionality. The TPIM 19 is operable to generate torque commands for Motors A and B referred to as $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are implemented by the control system, including the TPIM 19, to control the Motors A and B to motor torques, $T_A$ and $T_B$. Individual motor speed signals, $N_A$ and $N_B$ for Motor A and Motor B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to operator inputs, as captured by the UI 13, the supervisory HCP controller 5 and one or more of the other controllers determine required transmission output torque, $T_O$. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical hybrid transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
| --- | --- | --- |
| Mode I | C1 70 | |
| Fixed Ratio G1 | C1 70 | C4 75 |
| Fixed Ratio G2 | C1 70 | C2 62 |
| Mode II | C2 62 | |
| Fixed Ratio G3 | C2 62 | C4 75 |
| Fixed Ratio G4 | C2 62 | C3 73 |

The various transmission operating modes described in the table indicate which of the specific clutches C1, C2, C3, C4 are engaged or actuated for each of the operating modes. Additionally, in various transmission operating modes, Motor A 56 or Motor B 72 may each operate as electrical motors, designated as MA, MB respectively, and whether Motor A 56 is operating as a generator. A first mode or gear train, referred to as Mode I, is selected when the torque transfer device 70 is actuated in order to "ground" the outer gear member 46 of the third planetary gear set 28. A second mode or gear train, referred to as Mode II, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_O$, of shaft 64 from relatively slow to relatively fast within each mode (Mode I, II) of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The Mode I and Mode II refer to circumstances in which the transmission functions are controlled by one clutch, i.e. either clutch C1 62 or C2 70, and by the controlled speed and torque of the motor/generators 56 and 72. Certain ranges of operation are described below in which fixed ratios are achieved by applying an additional clutch, i.e. G1, G2, G3, or G4. This additional clutch may be clutch C3 73 or C4 75, as shown in the table, above.

When the additional clutch is applied, fixed ratio of input-to-output speed of the transmission, i.e. $N_I/N_O$, is achieved. The rotations of the motor/generators 56, 72 are dependent on internal rotation of the mechanism as defined by the clutching and proportional to the input speed, $N_I$, determined or measured at shaft 12. The electrical machines 56, 72 operate as either motors or generators. They are completely independent of engine-to-output power flow, thereby enabling both to function as electrical motors, both to function as electrical generators, or any combination thereof. This allows, for instance, during operation in Fixed Ratio G1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged, i.e. G1. RANGE 2 falls within mode I and mode II when clutches C2 62 and C1 70 are engaged, i.e. G2. A third fixed ratio range is available primarily during mode II when clutches C2 62 and C4 75 are engaged, i.e. G3, and a fourth fixed ratio range is available during mode II when clutches C2 62 and C3 73 are engaged, i.e. G4. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine input speed, $N_E$, measured at shaft 18, and transmission input speed, $N_I$, measured at shaft 12, and speed limitations of the electric Motors A and B, designated as $+/-N_A$, $+/-N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the Motors A and B 56, 72.

Figure 3:
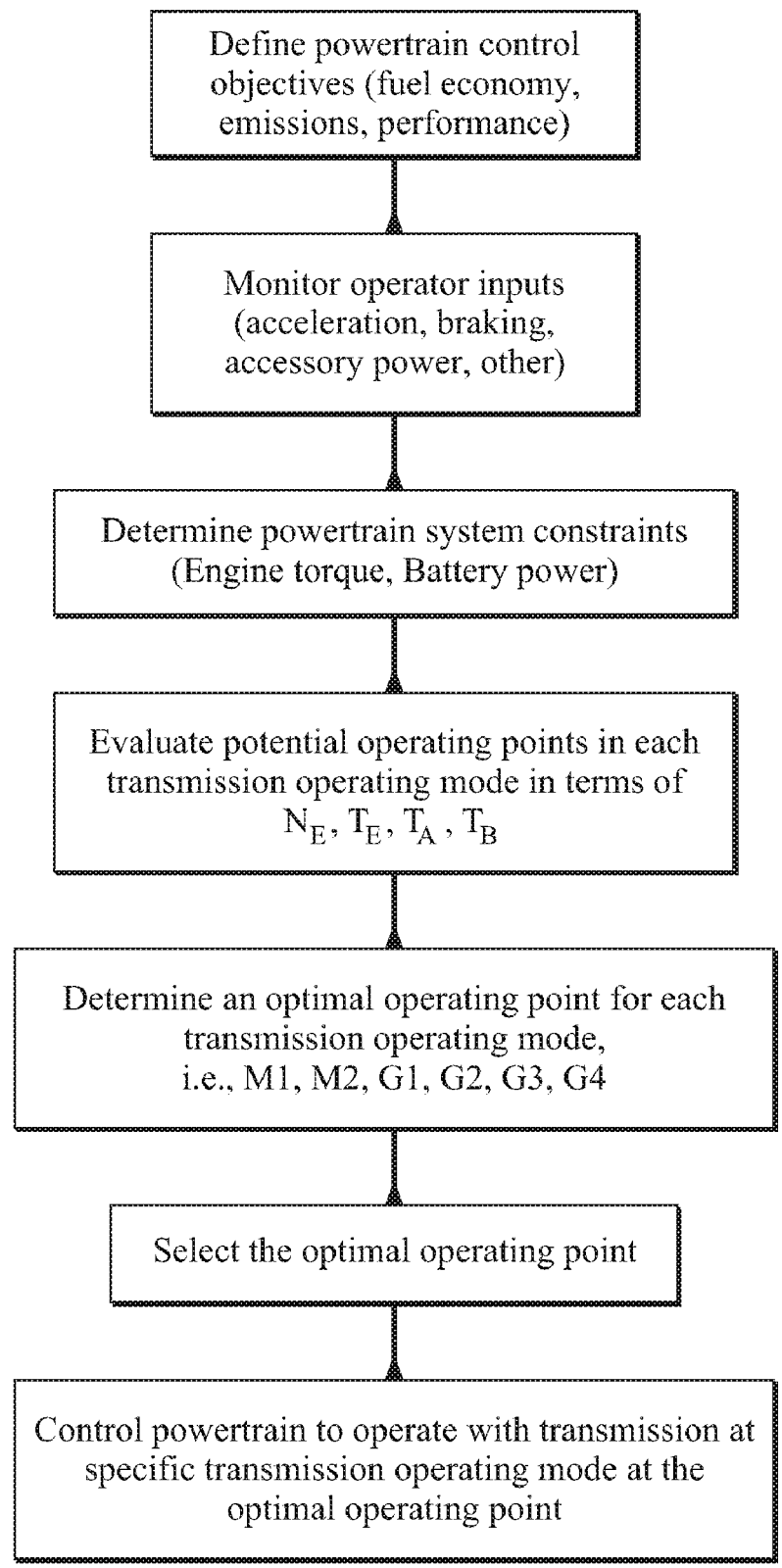
FIG. 3 is a flowchart, in accordance with the present invention.

Referring now to FIG. 3, operation of the vehicle propulsion system described with reference to FIG. 1 using the control system described with reference to FIG. 2 is now described in detail. The control system provides an overarching system control structure which controls operation of the powertrain, including the internal combustion engine 14, the electrical machines 56, 72, and the torque transfer clutches C1, C2, C3, C4 of the transmission, to operate in the selected transmission operating mode that delivers the optimal operating point for the powertrain.

The overarching control structure of the vehicle propulsion is executed in one of the controllers of the distributed controller architecture. The aforementioned torque-generative devices, comprising the internal combustion engine, and the electrical machines are each operable to provide motive torque to the transmission. The control system controls the engine, the electrical machines, and the transmission, based upon operator input. The transmission comprises the two-mode compound-split electro-mechanical device having rotating input member 12, rotating output member 64 operably connected to driveline 90, 92, and, at least three selectable torque-transfer devices 62, 70, 73, 75 operable to transfer motive torque from one of the torque-generative devices to the rotating output member 64. The transmission has the operating modes comprising the mode operation, either Mode I or Mode II, wherein a speed ratio between the input member, i.e. $N_I$, and the output member, i.e. $N_O$, is controllable based upon operation of the electrical machines. The transmission has operating modes comprising fixed ratio operations, G1, G2, G3, G4, wherein the transmission is controllable to one of a plurality of fixed speed ratios between the input member, i.e. $N_I$, and the output member, i.e. $N_O$, based upon actuation of at least one of the torque-transfer devices C1, C2, C3, and C4. The control system operable to control the transmission to one of the operating modes comprising the mode operation and the fixed ratio operation by controlling actuation of the at least three selectable torque-transfer devices, based upon the operator input, as well as operating parameters of the vehicle.

Referring again to FIG. 3, the powertrain control objectives are defined in parameters representative of fuel economy, emissions, and vehicle performance. Operator inputs are monitored, which typically comprise demands for axle torque, preferably comprising vehicle speed, acceleration, and braking. Powertrain system constraints are determined, which typically comprise engine torque ($T_E$), motor torques $T_A$, $T_B$, hardware constraints from the transmission, actuated clutch torque limitations $T_{CL\_N}$, and available electrical power from the ESD to the electrical motors, typically in terms of available power, $P_{BAT\_MIN}$ and $P_{BAT\_MAX}$.

To select an operating point at which to operate the powertrain, the controller evaluates all potential powertrain operating points for each transmission operating mode (i.e. Mode I, Mode II, G1, G2, G3, G4) in terms of operating parameters $N_E$, $T_E$, $T_A$, $T_B$. An optimal operating point is determined for each of the operating modes, Mode I, Mode II, G1, G2, G3, and G4. The controller preferably selects the best operating point, i.e. the optimal point, from among the aforementioned optimal operating points determined for each of the operating modes.

Figure 4:
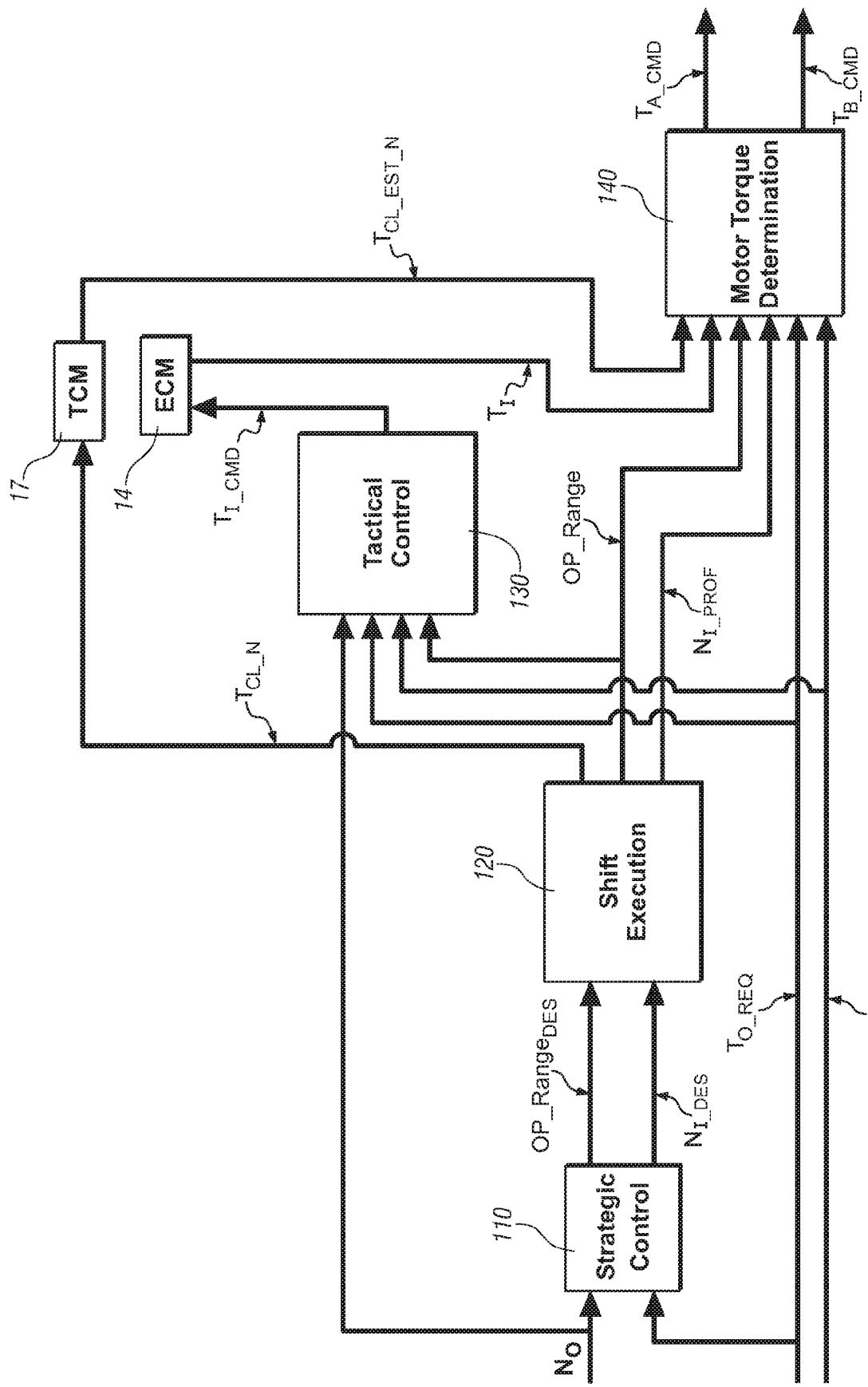
FIGS. 4-8 are schematic flowcharts, in accordance with the present invention.

Referring now to FIGS. 4-8, controlling operation of a hybrid powertrain is described, with reference to the exemplary powertrain described in FIGS. 1, 2, and 3. Referring specifically to FIG. 4, the method and system described herein comprise an aspect of strategic control optimization (Block 110), wherein a preferred or desired operating range state ($Op\_Range_{DES}$) is selected based primarily upon output speed, $N_O$ of shaft 64 and the operator torque request, $T_{O\_REQ}$. Output of the strategic control includes the preferred or desired operating range state ('$Op\_Range_{DES}$') and desired input speed ('$N_{I\_DES}$') each which are input to a shift execution control block 120. Other aspects of the overall architecture for strategic optimization and control of the exemplary powertrain are described in commonly assigned and co-pending U.S. patent application Ser. No. 11/561,140, previously incorporated by reference.

Referring now to FIGS. 5-8, the method comprises the following steps, executed as one or more algorithms in the control modules of the distributed control module architecture. The method includes monitoring output of the transmission, typically $N_O$, the operator torque request, $T_{O\_REQ}$, and, available battery power $P_{BAT\_MIN}$ and $P_{BAT\_MAX}$. At least one allowable operating range state, described with reference to Table 1, is identified, along with ranges of allowable input speeds $N_I$ and input torques $T_I$, for each. An output torque range for each of the allowable range states is determined. A cost for operating in each of the operating range states is calculated, and one is selected as a preferred operating range state based upon the calculated costs. The powertrain is controlled to the preferred operating range state thereafter. This operation is preferably executed during each 100 ms loop cycle. This operation is now described in detail.

Figure 5:
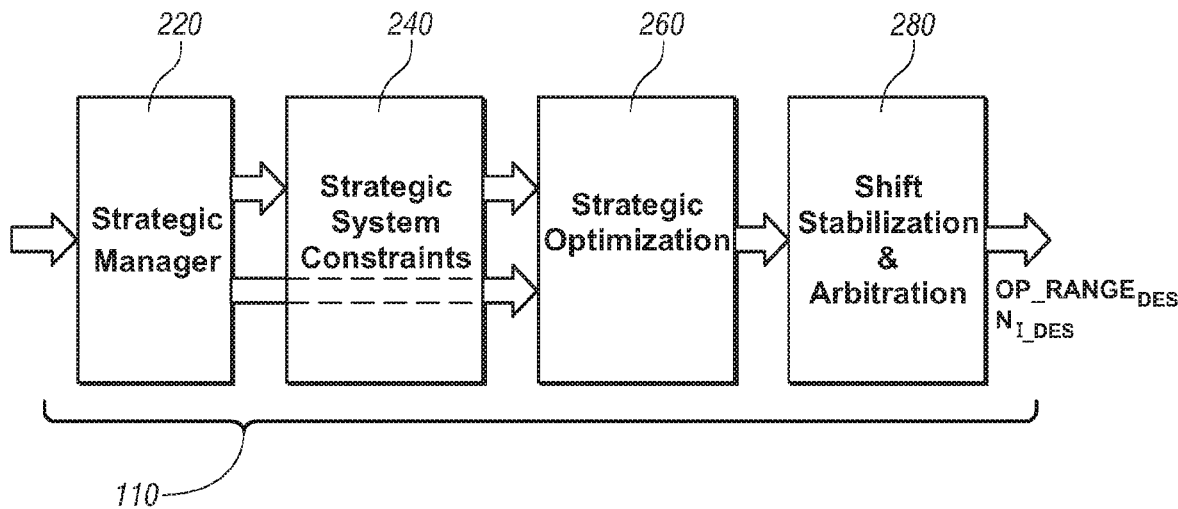

Referring now to FIG. 5, a functional block diagram details the strategic control block 110 of FIG. 4, and depicts inputs $N_O$ and $T_{O\_REQ}$ to a strategic manager segment 220, which has outputs to a system constraint segment 240 and an optimization segment 260. The output of the system constraint segment 240 is input to the optimization segment 260. The outputs of the optimization segment 260 are input to the shift stabilization and arbitration segment 280, which has an output comprising the preferred operating range state, OP_Range$_{DES}$ and desired input speed, $N_{I\_DES}$.

Figure 6:
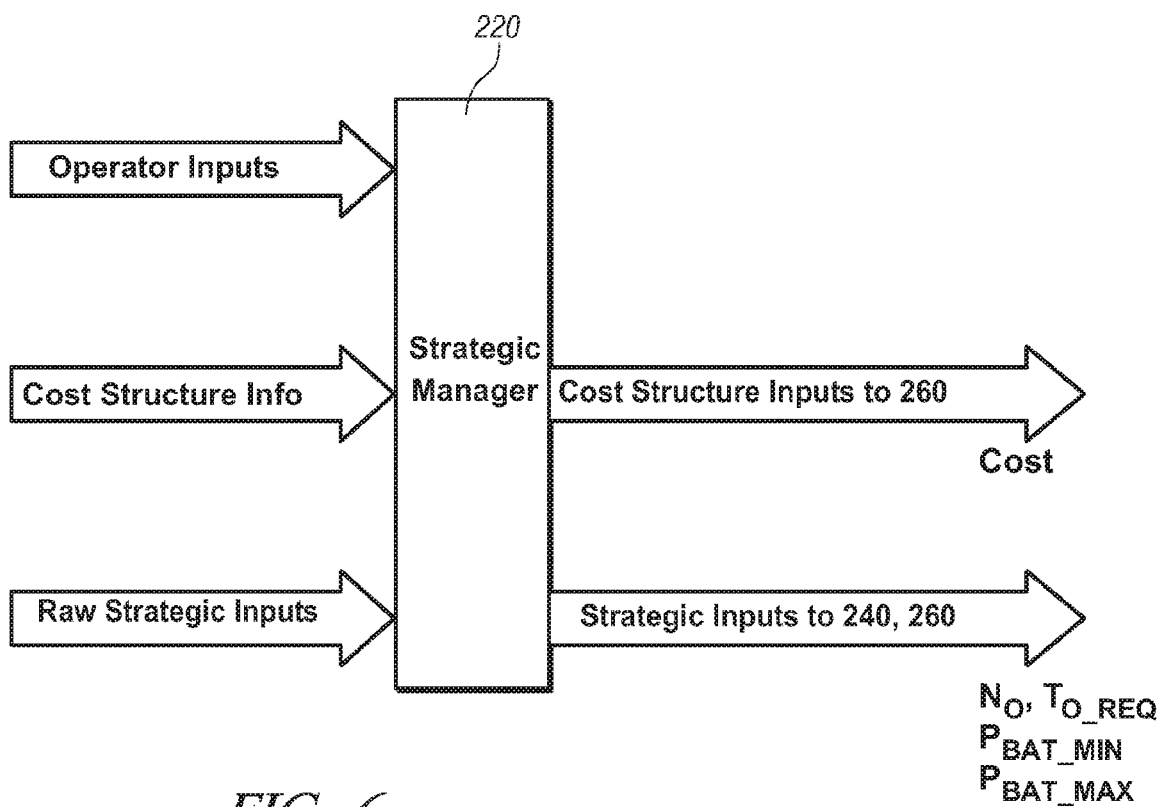

Referring now to FIG. 6, the strategic manager segment 220 includes operator inputs, typically torque requests and other inputs through the UI 13, cost structure information, described hereinbelow, and raw strategic inputs, comprising raw parametric signals related to the hybrid powertrain operating conditions, including those related to the ESD 74. Outputs from the strategic manager segment 220 comprise cost structure information (COST), strategic inputs including transmission output speed $N_O$, range of available battery power $P_{BAT\_MIN}$ and $P_{BAT\_MAX}$, and the operator torque request $T_{O\_REQ}$.

Figure 7:
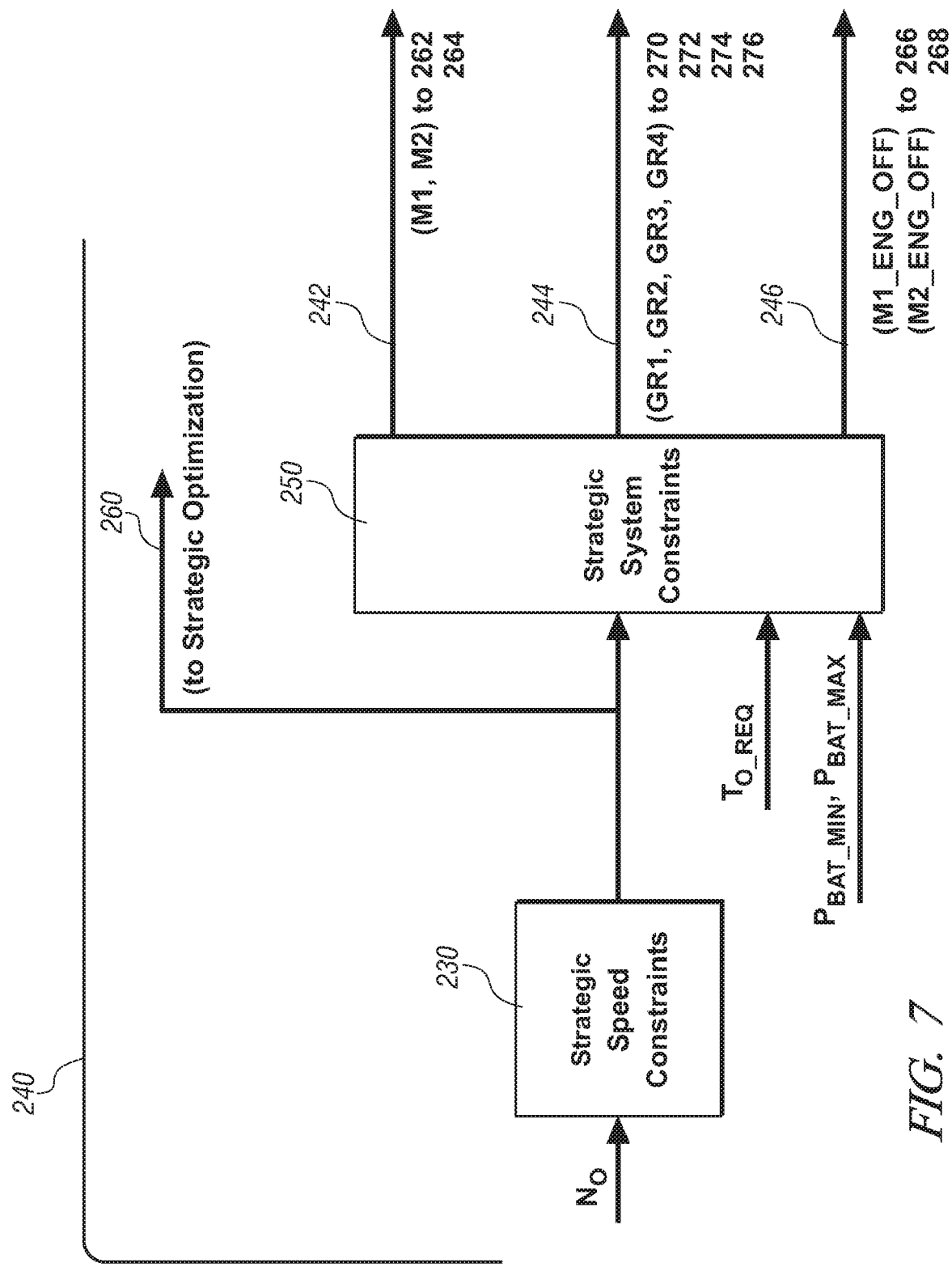

Referring now to FIG. 7, a detailed description of the strategic system constraints segment 240 is now described. The output speed $N_O$ is input to strategic speed constraint segment 230. The speed constraint segment 230 determines maximum and minimum input speeds for operating in each continuously variable mode, i.e., $N_{I\_MIN}\_M1$, $N_{I\_MAX}\_M1$, $N_{I\_MIN}\_M2$, and $N_{I\_MAX}\_M2$, in order to determine which of the hybrid operating range states, i.e., GR1, GR2, GR3, GR4, M1_Eng_Off, M1_Eng_On, M2_Eng_Off, and M2_Eng_On, are allowable based upon current operating constraints, specifically output speed $N_O$.

The allowable hybrid operating range states are output to the strategic optimization segment 260. The allowable hybrid operating range states are output to strategic system constraints segment 250 along with the range of available battery power $P_{BAT\_MIN}$ and $P_{BAT\_MAX}$ and the operator torque request $T_{O\_REQ}$, to determine a range of allowable input speeds $N_{I\_MIN}$, $N_{I\_MAX}$ and/or input torques $T_{I\_MIN}$, $T_{I\_MAX}$ for each of the hybrid operating range states, i.e., GR1, GR2, GR3, GR4, M1_Eng_Off, M1_Eng_On, M2_Eng_Off, and M2_Eng_On, based upon current operating constraints. There are three output paths 242, 244, 246 from segment 240 which supply inputs to optimization segment 260. Output path 242 provides relevant system constraint information, comprising a range of torque values in form of minimum and maximum output torques ($T_{O\_MAX}$, $T_{O\_MIN}$) and minimum and maximum input torques ($T_{I\_MAX}$, $T_{I\_MIN}$) over the range of engine input speeds $N_{I\_MIN}\_M1$, $N_{I\_MAX}\_M1$, $N_{I\_MIN}\_M2$, and $N_{I\_MAX}\_M2$ for each operating mode (M1, M2) with the engine on. This information is communicated to each of segments 262 and 264 of segment 260. Output path 244 provides relevant system constraint information, comprising a range of torque values in form of minimum and maximum output torques ($T_{O\_MAX}$, $T_{O\_MIN}$) and minimum and maximum input torques ($T_{I\_MAX}$, $T_{I\_MIN}$) for each of the fixed gear operations, i.e., GR1, GR2, GR3, GR4. This information is communicated to each of segments 270, 272, 274, and 276 of segment 260. Output path 246 provides relevant system constraint information, comprising a range of torque values in form of minimum and maximum output torques ($T_{O\_MAX}$, $T_{O\_MIN}$) for each operating mode (M1, M2) with the engine off. This information is communicated to each of segments 266 and 268 of segment 260.

Figure 8:
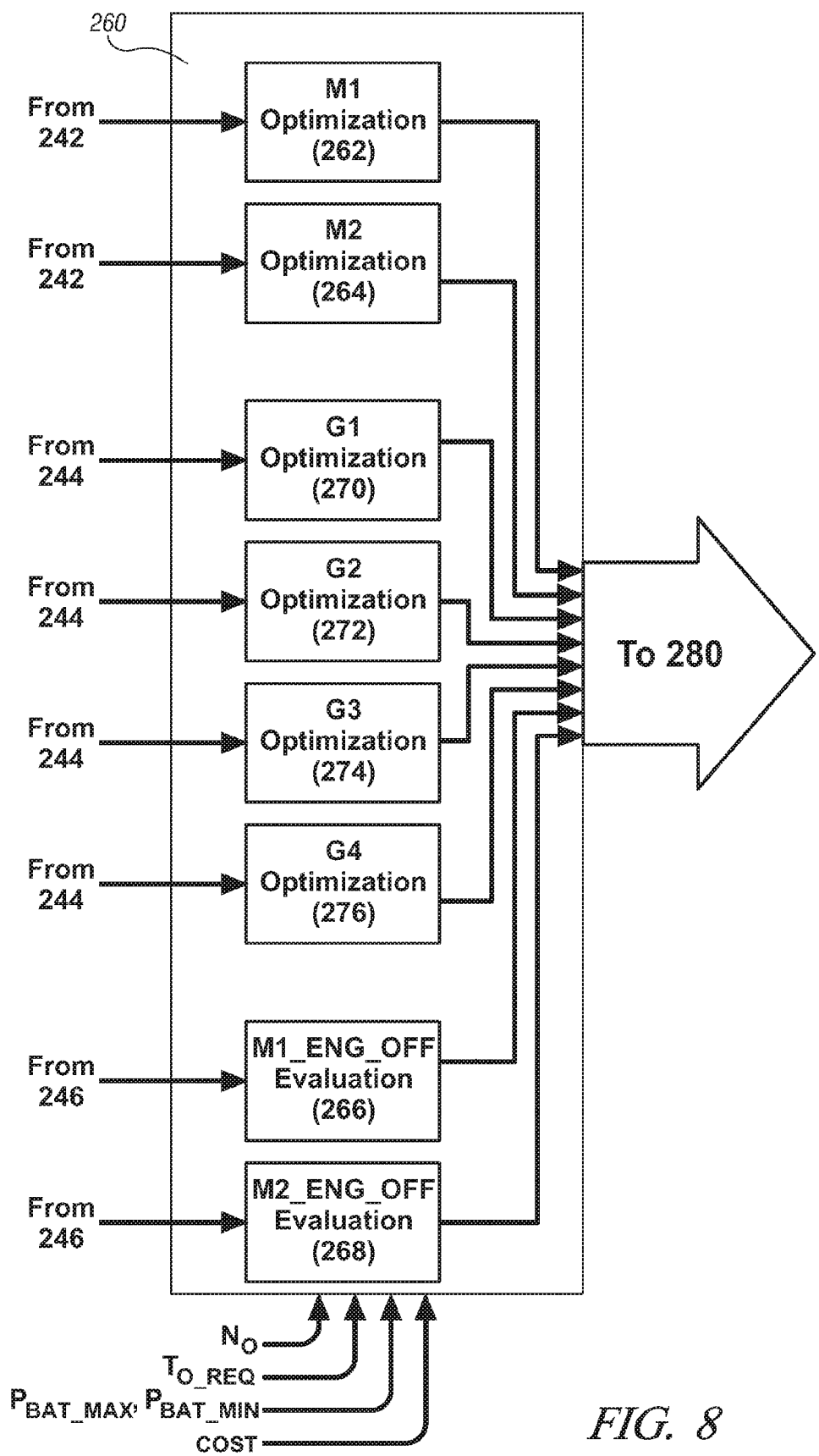

Referring now to FIG. 8, the strategic optimization segment 260 is now described. The allowable hybrid operating range states output from segment 240 to the strategic optimization segment 260 are used to identify which of the optimization segments 262, 264, 266, 268, 270, 272, 274 and 276 are to be executed. Segments 262, 264, 266, 268, 270, 272, 274 and 276 each comprise optimization segments, wherein an optimum operating cost ($P_{COST}$) is determined for each of the permissible operating range states, based upon the inputs previously described, including the previously described range of torque values and costs related to driveability, fuel economy, emissions, and battery life. The optimum operating cost preferably comprises a minimum operating cost at a powertrain operating Apoint within the range of attainable torque values for each operating range state.

Each of segments 262, 264, 266, 268, 270, 272, 274 and 276 generates an output which is provided as input to segment 280. The outputs comprise the respective optimum operating cost, Pcost, as follows: Pcost[M1_Eng_On] and correlated desired input speed $N_{I\_DES}$[M1], output from segment 262; Pcost[M2_Eng_On] and correlated desired input speed $N_{I\_DES}$[M2], output from segment 264; Pcost[M1_Eng_Off] output from segment 266; Pcost[M2_Eng_Off] output from segment 268; Pcost[GR1] output from segment 270; Pcost [GR2] output from segment 272; Pcost[GR3] output from segment 274; and, Pcost[GR4] output from segment 276.

The outputs of the optimization segment 260 are input to the shift stabilization and arbitration segment 280. In this segment, one of the determined operating range states is selected as a preferred operating range state, i.e., OP_Range$_{DES}$, based upon the calculated costs described hereinabove. The preferred operating range state is typically the operating range state having the minimum associated cost, as determined in segment 260. The powertrain is controlled to the preferred operating range state thereafter, although shifting gears and shifting the operating range state may be limited based upon other operating needs related to shift stabilization and powertrain control. This operation is preferably executed during each 100 ms loop cycle.

The cost structure information input to the strategic manager segment 220 and used in optimization segment 260 preferably comprises operating costs which are generally determined based upon factors related to vehicle driveability, fuel economy, emissions, and battery life for the determined torque range. Furthermore, costs are assigned and associated with fuel and electrical power consumption associated with a specific operating point of the powertrain system for the vehicle. Lower operating costs are generally associated with lower fuel consumption at high conversion efficiencies, lower battery power usage, and lower emissions for an operating point, and take into account a current operating range state of the powertrain system. The optimum operating cost ($P_{cost}$) can be determined by calculating a total powertrain system loss, comprising an overall system power loss and a cost penalty, such as can be associated with controlling battery state of charge. The overall system power loss comprises a term based upon engine power loss driven by fuel economy and exhaust emissions, plus losses in the mechanical system (e.g., gears, pumps, belts, pulleys, valves, chains), losses in the electrical system (e.g., wire impedances and switching and solenoid losses), and heat losses. Other losses include electrical machine power losses and internal battery power losses. Other factors may also be considered, including factors related to battery life due to depth of discharge of the ESD 74, current ambient temperatures and their effect on state of charge of the battery. Operating costs are preferably developed relative to specific powertrain/vehicle applications during vehicle calibration pre-production. An exemplary method for determining engine power losses are described in commonly assigned U.S. Pat. No. 7,149,618, issued on Dec. 12, 2006, entitled COST STRUCTURE METHOD INCLUDING FUEL ECONOMY AND ENGINE EMISSION CONSIDERATIONS, the contents of which are incorporated herein by reference.

Alternatively, to select an operating point at which to operate the powertrain, the controller evaluates all potential powertrain operating points in terms of operating parameters $N_E$, $T_E$, $T_A$, $T_B$. The optimal operating point and the corresponding transmission operating mode (i.e., one of Mode I, Mode II, G1, G2, G3, and, G4) are thus selected.

Alternatively, the controller evaluates all potential powertrain operating points for a specific transmission operating mode (e.g., Mode I, Mode II, G1, G2, G3, G4) in terms of operating parameters $N_E$, $T_E$, $T_A$, $T_B$. The optimal operating point is determined for the specific operating mode.

The controller executes commands and controls the transmission to operate in the specific operating mode at which the optimal or selected operating point is to be achieved, and further commands and controls the powertrain to operate at the optimal or selected operating point.

Controlling the powertrain preferably includes:
a. controlling torque transfers between Motors A and B and the transmission through electrical energy transfer between the ESD 74 and each of the motors, using the TPIM 19;
b. controlling operation of the engine 14, including, e.g., throttle control and engine fueling; and,
c. actuating at least one of the transmission torque-transfer clutches C1, C2, C3 and C4 to operate in the specific transmission operating mode, e.g., Mode I, Mode II, G1, G2, G3, G4, to effect a torque transfer between the Motors A and B and the engine, and the output shaft 64 of the transmission 10.

The best operating point may comprise operating in one of the mode operations, Mode I, Mode II, wherein the speed ratio between the input member 12 and the output member 64 is controllable based upon operation of the electrical machines 56, 72. Alternatively, and equally acceptable, the best operating point may comprise operating in one of the fixed ratio operations, G1, G2, G3, G4, wherein the transmission is controllable to one of the plurality of fixed speed ratios between the input member 12 and the output member 64 based upon actuation of at least one of the torque-transfer devices C1, C2, C3, and C4.

The invention has been described with specific reference to the preferred embodiments and modifications thereto. Further modifications and alterations may occur to others upon reading and understanding the specification. It is intended to include all such modifications and alterations insofar as they come within the scope of the invention.

The invention claimed is:

1. A vehicle propulsion system, comprising:
an internal combustion engine having an engine output;
an electro-mechanical transmission including
a transmission input and a transmission output, said transmission input operatively coupled to said engine output,
at least one planetary gear set operatively coupling the transmission input to the transmission output at a speed ratio,
at least one rotatable electric machine operatively coupled to said at least one planetary gear set, and
at least one torque transfer device applied and released to selectively establish one of (a) an electrically variable operating mode wherein the speed ratio is a function of the at least one rotatable electric machine's speed and (b) a fixed operating mode wherein the speed ratio is fixed; and
a control system operable to
monitor operator inputs and operating conditions of the engine and the transmission,
determine permissible ones of the electrically variable and fixed operating modes and respective optimum operating costs,
control operation of said engine, said at least one rotatable electrical machine, and said at least one torque transfer device to effect the one of said permissible ones of the electrically variable and fixed operating modes having a preferred optimum operating cost.

2. The propulsion system as claimed in claim 1 wherein said electro-mechanical transmission comprises a pair of compounded planetary gear sets and a pair of torque transfer devices applied and released in combinations to selectively establish one of either (a) any one of first and second electrically variable operating modes wherein the speed ratio of each electrically variable operating mode is a function of the at least one rotatable electric machine's speed and (b) a fixed operating mode wherein the speed ratio is fixed, and
wherein said control system is operable to control operation of said engine, said at least one rotatable electrical machine, and said pair of torque transfer devices to effect the one of said permissible ones of the electrically variable and fixed operating modes having a preferred optimum operating cost.

3. The propulsion system as claimed in claim 1 wherein said electro-mechanical transmission comprises a pair of compounded planetary gear sets and three torque transfer devices applied and released in combinations to selectively establish one of either (a) any one of first and second electrically variable operating modes wherein the speed ratio of each electrically variable operating mode is a function of the at least one rotatable electric machine's speed and (b) any one of two fixed operating modes wherein the speed ratio of each fixed operating mode is fixed, and
wherein said control system is operable to control operation of said engine, said at least one rotatable electrical machine, and said three torque transfer devices to effect the one of said permissible ones of the electrically variable and fixed operating modes having a preferred optimum operating cost.

4. The propulsion system as claimed in claim 1 wherein said electro-mechanical transmission comprises a pair of compounded planetary gear sets and three torque transfer devices applied and released in combinations to selectively establish one of either (a) any one of first or second electrically variable operating modes wherein the speed ratio of each electrically variable operating mode is a function of the at least one rotatable electric machine's speed and (b) any one of three fixed operating modes wherein the speed ratio of each fixed operating mode is fixed, and wherein said control system is operable to control operation of said engine, said at least one rotatable electrical machine, and said three torque transfer devices to effect the one of said permissible ones of the electrically variable and fixed operating modes having a preferred optimum operating cost.

5. The propulsion system as claimed in claim 1
wherein said electro-mechanical transmission comprises a pair of compounded planetary gear sets and four torque transfer devices applied and released in combinations to selectively establish one of either (a) any one of first or second electrically variable operating modes wherein the speed ratio of each electrically variable operating mode is a function of the at least one rotatable electric machine's speed and (b) any one of four fixed operating modes wherein the speed ratio of each fixed operating mode is fixed, and wherein said control system is operable to control operation of said engine, said at least one rotatable electrical machine, and said four torque transfer devices to effect the one of said permissible ones of the electrically variable and fixed operating modes having a preferred optimum operating cost.

6. A vehicle propulsion system, comprising:
an internal combustion engine having an engine output;
a two-mode, compound-split electro-mechanical transmission including
  a transmission input and a transmission output, said transmission input operatively coupled to said engine output,
  a pair of compounded planetary gear sets operatively coupling the transmission input to the transmission output at a speed ratio,
  at least one rotatable electric machine operatively coupled to at least one of the pair of planetary gear sets, and
  a first torque transfer device applied and released to selectively establish one of (a) an electrically variable operating mode wherein the speed ratio is a function of the at least one rotatable electric machine's speed and (b) a fixed operating mode wherein the speed ratio is fixed; and
a control system operable to
  monitor operator inputs and operating conditions of the engine and the transmission,
  determine permissible ones of the electrically variable and fixed operating modes and respective optimum operating costs,
  control operation of said engine, said at least one rotatable electrical machine, and said first torque transfer device to effect the one of said permissible ones of the electrically variable and fixed operating modes having a preferred optimum operating cost.

7. The propulsion system as claimed in claim 6
wherein said electro-mechanical transmission comprises a pair of torque transfer devices applied and released in combinations to selectively establish one of either (a) any one of first and second electrically variable operating modes wherein the speed ratio of each electrically variable operating mode is a function of the at least one rotatable electric machine's speed and (b) a fixed operating mode wherein the speed ratio is fixed, and wherein said control system is operable to control operation of said engine, said at least one rotatable electrical machine, and said pair of torque transfer devices to effect the one of said permissible ones of the electrically variable and fixed operating modes having a preferred optimum operating cost.

8. The propulsion system as claimed in claim 6
wherein said electro-mechanical transmission comprises three torque transfer devices applied and released in combinations to selectively establish one of either (a) any one of first and second electrically variable operating modes wherein the speed ratio of each electrically variable operating mode is a function of the at least one rotatable electric machine's speed and (b) any one of two fixed operating modes wherein the speed ratio of each fixed operating mode is fixed, and wherein said control system is operable to control operation of said engine, said at least one rotatable electrical machine, and said three torque transfer devices to effect the one of said permissible ones of the electrically variable and fixed operating modes having a preferred optimum operating cost.

9. The propulsion system as claimed in claim 6
wherein said electro-mechanical transmission comprises three torque transfer devices applied and released in combinations to selectively establish one of either (a) any one of first or second electrically variable operating modes wherein the speed ratio of each electrically variable operating mode is a function of the at least one rotatable electric machine's speed and (b) any one of three fixed operating modes wherein the speed ratio of each fixed operating mode is fixed, and wherein said control system is operable to control operation of said engine, said at least one rotatable electrical machine, and said three torque transfer devices to effect the one of said permissible ones of the electrically variable and fixed operating modes having a preferred optimum operating cost.

10. The propulsion system as claimed in claim 6
wherein said electro-mechanical transmission comprises four torque transfer devices applied and released in combinations to selectively establish one of either (a) any one of first or second electrically variable operating modes wherein the speed ratio of each electrically variable operating mode is a function of the at least one rotatable electric machine's speed and (b) any one of four fixed operating modes wherein the speed ratio of each fixed operating mode is fixed, and wherein said control system is operable to control operation of said engine, said at least one rotatable electrical machine, and said four torque transfer devices to effect the one of said permissible ones of the electrically variable and fixed operating modes having a preferred optimum operating cost.

11. A vehicle propulsion system, comprising:
an internal combustion engine having an engine output;
a two-mode, compound-split electro-mechanical transmission including
  a transmission input and a transmission output, said transmission input operatively coupled to said engine output,
  a pair of compounded planetary gear sets operatively coupling the transmission input to the transmission output at a speed ratio,
  a pair of rotatable electric machines, each of said pair of rotatable electric machines operatively coupled to a respective one of the pair of planetary gear sets, and
  a first torque transfer device applied and released to selectively establish one of (a) an electrically variable operating mode wherein the speed ratio is a function of the rotatable electric machines' speeds and (b) a fixed operating mode wherein the speed ratio is fixed; and a control system operable to
monitor operator inputs and operating conditions of the engine and the transmission,
determine permissible ones of the electrically variable and fixed operating modes and respective optimum operating costs,
control operation of said engine, said pair of rotatable electrical machines, and said first torque transfer device to effect the one of said permissible ones of the electrically variable and fixed operating modes having a preferred optimum operating cost.

12. The propulsion system as claimed in claim 11
wherein said electro-mechanical transmission comprises a pair of torque transfer devices applied and released in combinations to selectively establish one of either (a) any one of first and second electrically variable operating modes wherein the speed ratio is a function of the rotatable electric machines' speeds and (b) a fixed operating mode wherein the speed ratio is fixed, and
wherein said control system is operable to control operation of said engine, said pair of rotatable electrical machines, and said pair of torque transfer devices to effect the one of said permissible ones of the electrically variable and fixed operating modes having a preferred optimum operating cost.

13. The propulsion system as claimed in claim 11
wherein said electro-mechanical transmission comprises three torque transfer devices applied and released in combinations to selectively establish one of either (a) any one of first and second electrically variable operating modes wherein the speed ratio of each electrically variable operating mode is a function of the rotatable electric machines' speeds and (b) any one of two fixed operating modes wherein the speed ratio of each fixed operating mode is fixed, and
wherein said control system is operable to control operation of said engine, said pair of rotatable electrical machines, and said three torque transfer devices to effect the one of said permissible ones of the electrically variable and fixed operating modes having a preferred optimum operating cost.

14. The propulsion system as claimed in claim 11
wherein said electro-mechanical transmission comprises three torque transfer devices applied and released in combinations to selectively establish one of either (a) any one of first and second electrically variable operating modes wherein the speed ratio of each electrically variable operating mode is a function of the rotatable electric machines' speeds and (b) any one of three fixed operating modes wherein the speed ratio of each fixed operating mode is fixed, and
wherein said control system is operable to control operation of said engine, said pair of rotatable electrical machines, and said three torque transfer devices to effect the one of said permissible ones of the electrically variable and fixed operating modes having a preferred optimum operating cost.

15. The propulsion system as claimed in claim 11
wherein said electro-mechanical transmission comprises four torque transfer devices applied and released in combinations to selectively establish one of either (a) any one of first and second electrically variable operating modes wherein the speed ratio of each electrically variable operating mode is a function of the rotatable electric machines' speeds and (b) any one of four fixed operating modes wherein the speed ratio of each fixed operating mode is fixed, and
wherein said control system is operable to control operation of said engine, said pair of rotatable electrical machines, and said four torque transfer devices to effect the one of said permissible ones of the electrically variable and fixed operating modes having a preferred optimum operating cost.

16. A vehicle propulsion system, comprising:
an internal combustion engine having an engine output;
an electro-mechanical transmission including
a transmission input and a transmission output, said transmission input operatively coupled to said engine output,
a plurality of compounded planetary gear sets operatively coupling the transmission input to the transmission output at a speed ratio,
at least one rotatable electric machine operatively coupled to at least one of the plurality of planetary gear sets,
a plurality of electrically variable operating modes wherein the speed ratio is a function of said at least one rotatable electric machine's speed,
a plurality of fixed operating modes wherein the speed ratio is fixed, and
a plurality of torque transfer devices applied and released in combinations to selectively establish one of either (a) any one of said plurality of electrically variable operating modes and (b) any one of said plurality of fixed operating modes; and
a control system operable to
monitor operator inputs and operating conditions of the engine and the transmission,
determine permissible ones of the pluralities of electrically variable and fixed operating modes and respective optimum operating costs,
control operation of said engine, said at least one rotatable electrical machine, and said first torque transfer device to effect the one of said permissible ones of the pluralities of electrically variable and fixed operating modes having a preferred optimum operating cost.

17. The propulsion system as claimed in claim 16 wherein said electro-mechanical transmission comprises a two-mode, compound-split, electro-mechanical transmission.

* * * * *